US008932065B2

(12) United States Patent
Gerling

(10) Patent No.: US 8,932,065 B2
(45) Date of Patent: Jan. 13, 2015

(54) ADAPTER FOR A SOCKET OF A TRAILER COUPLING

(71) Applicant: WESTFALIA-Automotive GmbH, Rheda-Wiedenbruck (DE)

(72) Inventor: Hubert Gerling, Lippstadt (DE)

(73) Assignee: WESTFALIA-Automotive GmbH, Rheda-Wiedenbruck (DE)

( * ) Notice: Subject to any disclaimer, the term of this patent is extended or adjusted under 35 U.S.C. 154(b) by 14 days.

(21) Appl. No.: 13/938,286

(22) Filed: Jul. 10, 2013

(65) Prior Publication Data

US 2014/0017910 A1 Jan. 16, 2014

(30) Foreign Application Priority Data

Jul. 10, 2012 (DE) .......................... 10 2012 013 653

(51) Int. Cl.
*H01R 31/00* (2006.01)
*H01R 33/00* (2006.01)
*B60D 1/64* (2006.01)

(52) U.S. Cl.
CPC ....................................... *B60D 1/64* (2013.01)
USPC ............................................ 439/35; 439/638

(58) Field of Classification Search
CPC ........ H01R 13/35; H01R 25/00; H01R 27/00; H01R 29/00; H01R 27/02; H01R 31/06; H01R 31/065; H01R 2103/00
USPC ........................................... 439/35, 638, 222
See application file for complete search history.

(56) References Cited

U.S. PATENT DOCUMENTS

| 3,883,845 | A | | 5/1975 | DeVita |
| 3,970,860 | A | | 7/1976 | Purdy |
| 5,030,938 | A | | 7/1991 | Bondzeit |
| 6,007,346 | A | * | 12/1999 | Gutierrez et al. ............... 439/35 |
| 6,994,592 | B1 | * | 2/2006 | Gannon ........................ 439/638 |
| 7,234,954 | B1 | * | 6/2007 | Srage et al. ................... 439/222 |
| 7,273,384 | B1 | * | 9/2007 | So ................................. 439/172 |
| 7,597,570 | B2 | * | 10/2009 | So ................................. 439/172 |
| 7,658,635 | B2 | * | 2/2010 | Gilchrist ....................... 439/357 |
| 8,113,855 | B2 | * | 2/2012 | Green et al. .................. 439/131 |
| 8,460,017 | B1 | * | 6/2013 | Green et al. .................. 439/131 |

(Continued)

FOREIGN PATENT DOCUMENTS

| DE | 29520086 | 6/1996 |
| DE | 20016685 | 5/2001 |

(Continued)

*Primary Examiner* — Chandrika Prasad
(74) *Attorney, Agent, or Firm* — Hoffmann & Baron, LLP

(57) ABSTRACT

An adapter for a trailer socket of a trailer coupling for coupling a trailer, wherein the adapter comprises a base body and a primary contact arrangement mounted thereon and comprising a plurality of primary contacts corresponding to a European or German standard, in particular seven primary contacts according to DIN 1724 or thirteen primary contacts according to ISO 11446, for establishing an electric connection to corresponding socket contacts of the trailer socket. The adapter comprises a secondary contact arrangement mounted on the base body with secondary contacts according to a US American standard, so that a trailer plug corresponding to the US American standard can be electrically connected to the secondary contact arrangement for the power supply of a trailer, the secondary contact arrangement and the primary contact arrangement being connected to one another via an electric connection arrangement.

13 Claims, 3 Drawing Sheets

(56) References Cited

U.S. PATENT DOCUMENTS

2002/0125771 A1 9/2002 Kaminski
2007/0202711 A1 8/2007 Dilgard
2010/0308984 A1 12/2010 Ehrlich et al.
2012/0156896 A1* 6/2012 Corless et al. ................. 439/35

FOREIGN PATENT DOCUMENTS

| | | |
|---|---|---|
| DE | 60000425 | 6/2003 |
| DE | 20304650 | 7/2003 |
| DE | 102007048378 | 4/2009 |
| EP | 1414117 | 4/2004 |

* cited by examiner

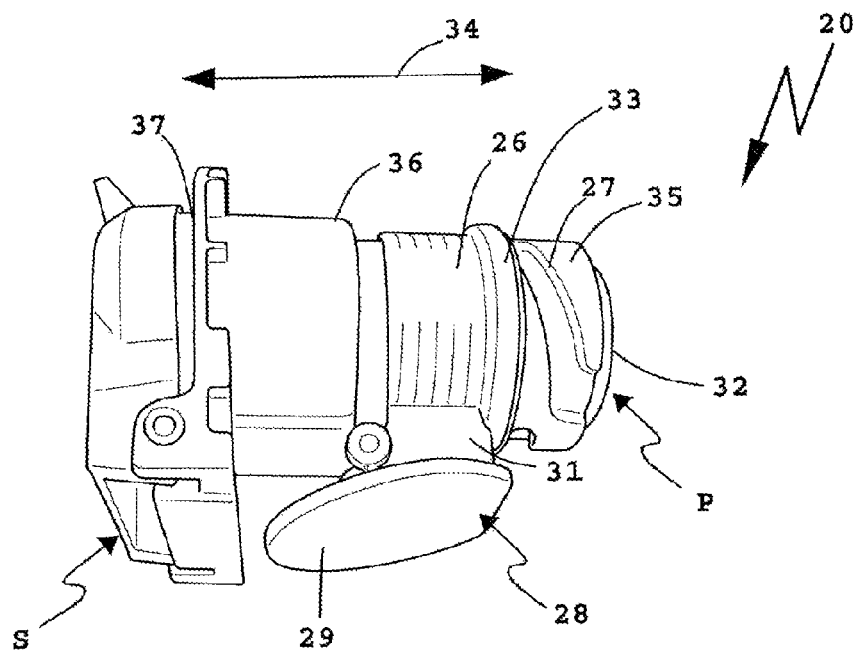
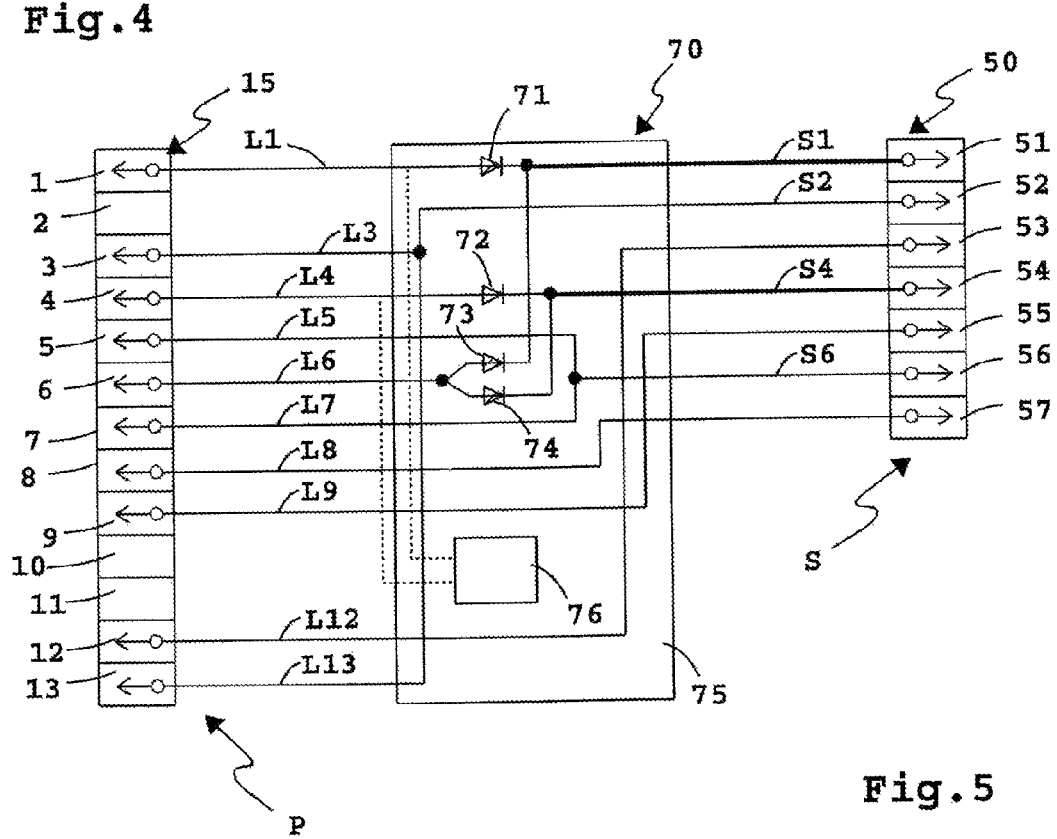

ADAPTER FOR A SOCKET OF A TRAILER COUPLING

CROSS-REFERENCE TO RELATED APPLICATIONS

This application claims priority to DE 102012013653.6, filed Jul. 10, 2012.

BACKGROUND OF THE INVENTION

The invention relates to an adapter for a trailer socket of a trailer coupling for coupling a trailer, wherein the adapter comprises a base body and a primary contact arrangement mounted thereon and comprising a plurality of primary contacts corresponding to a European or German standard, in particular seven primary contacts according to DIN 1724 or thirteen primary contacts according to ISO 11446, for establishing an electric connection to corresponding socket contacts of the trailer socket.

The trailer socket may for example be a 13-pin trailer socket according to ISO 11446 or a 7-pin trailer socket according to DIN 1724. The provision of an adapter designed for example for connecting a 13-pin trailer plug according to ISO 11446 to a 7-pin trailer socket according to DIN 1724 is known. The known adapter allows for standardised wiring at low cost. However, apart from these typical DIN-to-DIN adapters or DIN-to-ISO adapters, no other socket adapters are available. As a rule, country-specific sockets or socket wiring have to be provided, which is complicated and expensive.

SUMMARY OF THE INVENTION

The present invention is therefore based on the problem of providing an alternative adapter for a trailer socket in order to expand the range of application for a standard trailer socket according to DIN 1724 or ISO 11446.

To solve this problem, it is provided in an adapter of the type referred to above that the adapter comprises a secondary contact arrangement mounted on the base body with secondary contacts according to a US American standard, so that a trailer plug corresponding to the US American standard can be electrically connected to the secondary contact arrangement for the power supply of a trailer, the secondary contact arrangement and the primary contact arrangement being connected to one another via an electric connection arrangement.

A trailer coupling developed for the European market and having corresponding wiring, for example, can now be used on the US American market as well without requiring complex conversion measures, adaptations or specific trailer sockets.

The pin assignment of a 13-pin socket according to DIN ISO 11446 may for example be as follows:
Contact 1: Direction indicator left
Contact 2: Rear fog light
Contact 3: Earth for circuits 1-8
Contact 4: Direction indicator right
Contact 5: Rear light, contour light, number plate light right
Contact 6: Brake lights
Contact 7: Rear light, contour light, number plate light left
Contact 8: Reversing light
Contact 9: Power supply (permanent plus)
Contact 10: Charging line for trailer battery, power supply, ignition switch-controlled
Contact 11: Earth for circuit via contact 10
Contact 12: Trailer identifier
Contact 13: Earth for circuit 9

The pin assignment of the 7-pin socket according to DIN 1724, ISO 1724 and ISO 1185 is as follows:
Contact 1: Direction indicator left
Contact 2: Rear fog light
Contact 3: Earth for circuits 1-7
Contact 4: Direction indicator right
Contact 5: Rear light, contour light, number plate light right
Contact 6: Brake lights
Contact 7: Rear light, contout light, number plate light left It can for example be seen that contacts 1 to 7 are identical for ISO 11446 and DIN 1724, while the 13-pin socket is provided with additional contacts, for example for a permanent plus circuit of the trailer. Contact 12 of a trailer socket according to ISO 11446 is basically provided for a trailer identification. This, however, is rarely the case in practical applications.

At this point, further aspect of the invention becomes relevant, according to which an electric connection set is provided for a trailer coupling for operation with the adapter according to the invention, the connection set comprising a trailer socket with a 13-pin contact arrangement according to ISO 11446 and contact 12 of the trailer socket being for example configured for the selection of an electric brake of the trailer. Unless needed for other purposes, other contacts but contact 12 would obviously be suitable as well. Contact 10 is for example suitable for this purpose, if the trailer does not require a charging line.

The adapter expediently comprises at least one secondary contact for transmitting a signal for the selection of an electric brake of the trailer. This secondary contact is electrically connected to a primary contact which matches the contact, for example contact 12, provided for the selection of an electric brake of the trailer.

Both the primary contacts and the secondary contacts may for example have plug-in projections or sockets or both, depending on the requirements of the standard, the socket into which the adapter is inserted or the plug which is inserted into the adapter. In a primary side designed according to ISO 11446, for example, the primary contacts are represented by plug-in projections. If, on the other hand, the primary side is to meet the requirements of DIN 1724, the contacts 2, 5, 7 are for example designed as female contacts or sockets.

The secondary contacts are preferably designed as sockets.

The secondary contact arrangement expediently comprises seven electric contacts. The secondary side of the adapter is expediently constructed in accordance with a mechanical and electric design which the US manufacturer Pollack produces in great numbers. The secondary side of the adapter therefore for example corresponds to a Pollack socket type. This being so, the term "standard" should also be understood to mean that the US plug or the secondary side respectively corresponds to a standard commonly observed in the market.

An advantageous aspect of the invention provides that the secondary contact arrangement comprises at least one brake light/direction indicator contact provided for the selection of a combined brake light/direction indicator of the trailer. This is because in the USA the brake light commonly acts as direction indicator as well. The brake light/direction indicator contact (of the secondary side) is electrically connected to a brake light primary contact for the selection of a brake light and to an indicator primary contact of the primary contact arrangement for the selection of a left- or right-hand direction indicator in such a way that that a current is applied to the secondary-side brake light/direction indicator contact if a current is applied to the brake light primary contact or the direction indicator primary contact. If therefore the primary contact for brake lights or the primary contact for direction indicators is supplied with power, the output-side secondary contact—the secondary brake light/direction indicator contact - has power as well. It is obviously expedient if a combined secondary brake light/direction indicator contact is provided both for the right-hand and for the left-hand side of the trailer, i.e. for the right-hand and the left-hand combined brake light/direction indicator.

A feedback between the primary contacts for brake lights and direction indicators via the secondary brake light/direction indicator contact is expediently avoided by means of the following measures. It is expediently provided that at least one electric diode element is provided between the brake light primary contact and the brake light/direction indicator contact or between the direction indicator primary contact and the brake light/direction indicator contact, the diode element being electrically conductive in a direction from the brake light primary contact or the direction indicator primary contact to the brake light/direction indicator contact and non-conducting in the opposite direction. The diode element may for example comprise a blocking diode, a transistor or the like.

Other electric measures, for example complex electronic simulation or decoupling measures, may of course also be provided in the adapter. Galvanic isolation is also possible, for example by separating the primary-side circuit from the secondary-side circuit galvanivally using a transformer in order to avoid the feedback referred to above.

The base body is expediently provided with a thread for tightening into a mating thread of the trailer socket. The primary side of the base body is expediently designed to be standardised, i.e. it has the mechanical properties of a typical trailer plug according to ISO 11446 or DIN 1724 for example. A screw thread can also be designed in the manner of a bayonet.

A cover retaining projection for holding a cover of the trailer socket in an open position is expediently provided on the base body. This cover retaining projection expediently also serves as an anti-rotation device, so that the adapter, which is a quasi-plug on its primary side, cannot be inadvertently unscrewed from the trailer socket.

The cover retaining projection expediently has an external contour which fits into an internal contour of the cover of the trailer socket, for example positively, or at least positively in some sections.

The secondary side of the adapter is expediently closable, for example by means of a cover. The cover is preferably designed as a hinged cover, i.e. being preferably mounted pivotable on the base body.

The base body is expediently represented by a housing of the adapter. The base body may of course a single-piece or a multi-piece component. It is also possible for the respective contact arrangements to be designed as contact inserts which can be inserted into a corresponding recess of the base body or the base housing of the adapter.

One primary contact of the adapter is expediently provided for the selection of an electric brake of the trailer and connected to a corresponding secondary contact. This primary contact may for example be contact 12. Other contacts can obviously be assigned accordingly.

A further circuit variant can provide that separate primary rear light contacts are present for a right-hand and a left-hand rear light of the trailer on the primary side, i.e. in the primary contact arrangement, while a single secondary rear light contact is provided in the secondary contact arrangement and is in this case advantageously connected electrically to both of the separate primary rear light contacts. Here, too, a diode circuit may be provided, preventing for example a flow of current from one primary rear light contact to the other primary rear light contact via the secondary rear light contact.

BRIEF DESCRIPTION OF THE DRAWINGS

Embodiments of the invention are explained below with reference to the drawing, of which:

FIG. 4 is an oblique side view of the adapter according to FIGS. 1-3 from below, FIG. 5 is a circuit diagram and an electric connection arrangement of the adapter according to the preceding figures.

DETAILED DESCRIPTION OF THE PREFERRED EMBODIMENTS

Figure 1:
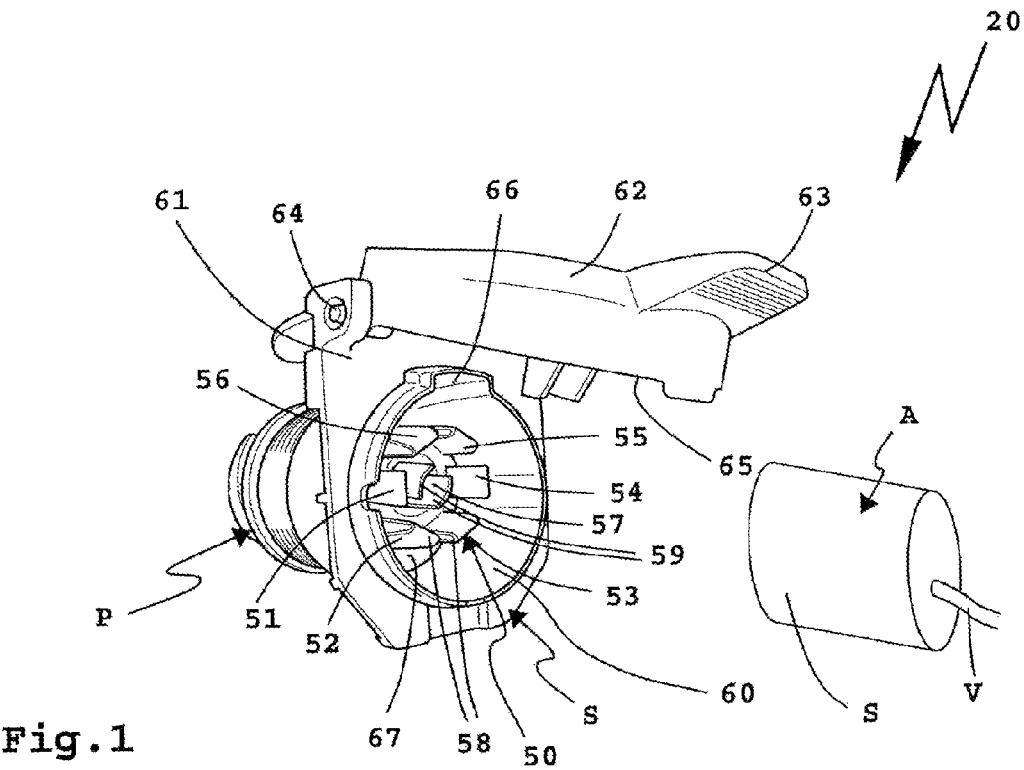
FIG. 1 is an oblique perspective view of an adapter according to the invention from its secondary side.
Figures 2, 3:
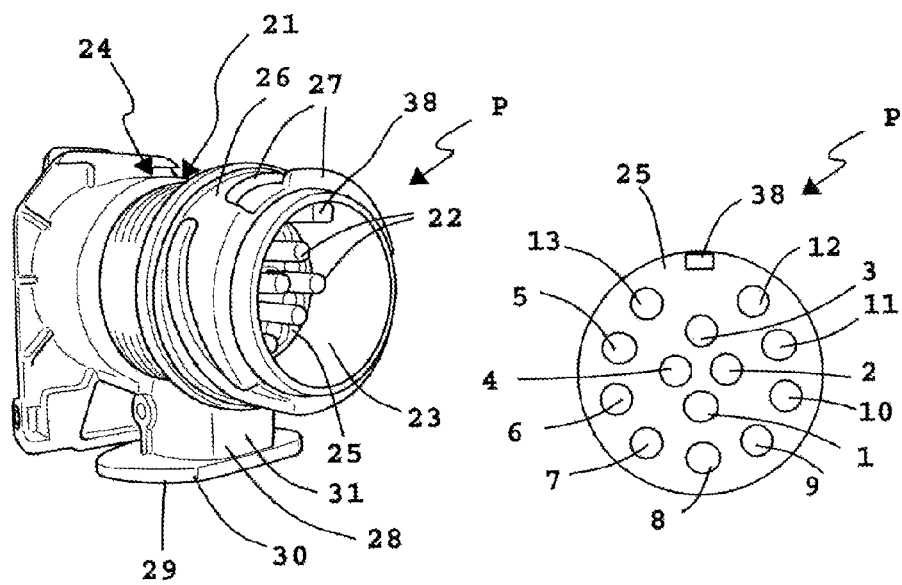
FIG. 2 is an oblique perspective view of the adapter according to FIG. 1 from its primary side.
FIG. 3 is a front view of a primary contact arrangement of the adapter according to FIG. 2.
Figure 6:
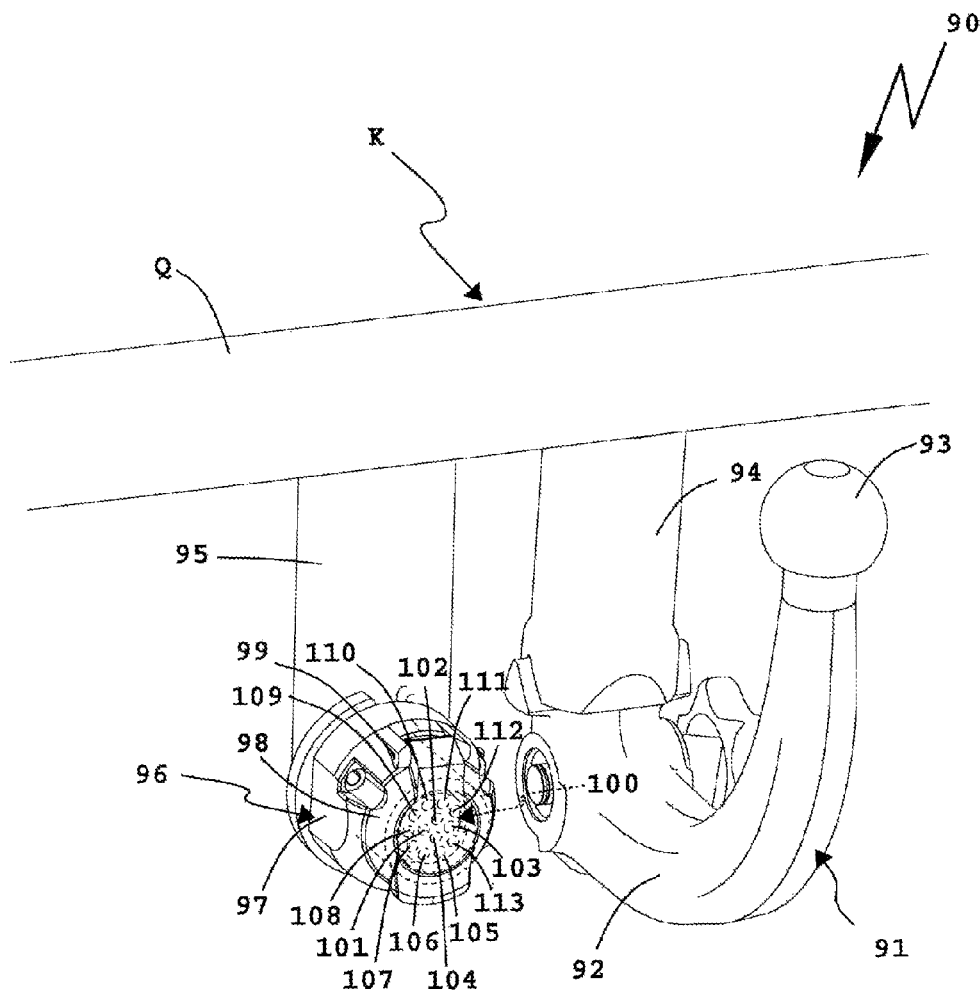
FIG. 6 shows a trailer coupling with a trailer socket into which the adapter according to FIGS. 1-5 can be inserted.

A coupling arrangement 90 as shown in FIG. 6 comprises a trailer coupling 91 with a coupling arm 92 on which a coupling part, for example a spherical head 93, is mounted.

The trailer coupling 91 is designed to be releasable, i.e. the coupling arm 92 can for example be mounted on, for example plugged onto, a holder 94 or removed again from this holder 94.

This is of course irrelevant in the present context; the invention can obviously be used in a trailer coupling which can be pivoted between a position of use and a position of non-use, for example, or in a trailer coupling which is permanently mounted on the towing vehicle.

The holder 94 is for example mounted on a crossmember Q of a motor vehicle K. As a rule, the holder 94 is concealed behind a rear valance or a bumper of the motor vehicle K, which is not shown, however.

In a socket holder 95, which may for example be stationary or movable, a trailer socket 96 having a contact arrangement 100 with socket contacts 101-113 is located. The contact arrangement 100 is located in a housing 97 of the trailer socket 96 and expediently closable by a cover 98, which is, however, not necessary. The cover 98 is in the known manner pivotably mounted on the housing 97 by way of a pivot bearing 99 and can be moved between a closed position as shown in the drawing and an open position in which the socket contacts 101-113 are accessible.

The socket contacts 101-113 are for example designed as receptacles. The pin assignment of the socket contacts 101-113 follows the arrangement for contacts 1-9, 13 according to ISO 11446 as explained above. Contact(s) 2 and/or 10 and/or 11 may be unassigned, for example.

A plug according to a US standard, for example a so-called Pollack plug, cannot be directly connected to the trailer socket 96. For the brake lights and the right-hand and left-hand direction indicators, for example, the separate socket contacts 106, 104 and 101 are provided, while in the US standard the left-hand direction indicator also serves as the left-hand brake light of the trailer and the right-hand direction indicator serves as the right-hand brake light of the trailer in a manner of speaking. In addition, the US plug does not match the European trailer socket 96 in mechanical terms. This is where the invention becomes relevant.

To connect for example a so-called Pollack plug according to a US standard or a typical US convention to the trailer socket 96, the adapter 20 having a primary side P and a secondary side S is provided. The primary side P corresponds to ISO 11446, i.e. the primary contacts 1-13 of a primary contact arrangement 15 have a typical electric assignment according to ISO 11446 and a mechanical arrangement corresponding to standard. The primary contacts 1-13 are for example designed as plug-in projections 22.

The plug-in projections 22 are for example arranged in a recess 23 of a housing 21 of the adapter 20. The housing 21 forms a base body 24 of the adapter 20. The primary contacts 1-13 are for example arranged on a contact insert 25 located in the interior of the housing 21. The primary contacts 1-13 or the plug-in projections 22 are surrounded by a circumferential wall 26 of the housing 21. On the outside of the circumferential wall 26, a thread 27 is provided, which can be screwed into a female thread of the trailer socket 96 which is not visible in the drawing.

On the circumferential wall 26, there is further provided a cover retaining projection 28 which projects radially outwards beyond the circumferential wall 26. The cover retaining projection 28 holds the cover 98 of the trailer socket 96 open. It further forms an anti-rotation device to secure the adapter 20 screwed into the female thread of the trailer socket 96 against rotation when the cover retaining projection 28 is in engagement with the cover 98.

The cover retaining projection 28 comprises a plate 29 the external contour 30 of which corresponds to an internal contour of the cover 98. The external contour 30 fits into the internal contour of the cover 98 at least substantially positively. A foot part 31 extends between the plate 29 and the circumferential wall 26.

Between the section of the circumferential wall 26 where cover retaining projection 28 is located and a free end face region of the circumferential wall 26, a flanged projection 33 extends; this forms a stop body while the thread 27 is tightened into the trailer socket 96.

The primary contacts 1-13 have the following pin assignment:

1 Direction indicator left
2
3 Earth for pins 1-8
4 Direction indicator right
6 Brake light left and right
7 Rear light left and right
8 Reversing light
9 Permanent plus K130
10
11
12 Electric brake
13 Earth for contact 9

On the secondary side S, secondary contacts 51-57 of a secondary contact arrangement 50 are provided.

The secondary contacts 51-57 are designed as contact tabs which fit into corresponding sockets on a diagrammatically represented so-called Pollack plug S. The Pollack plug S supplies via a connecting line V electric components of a trailer A of which only the plug S is shown, for example brake lights/direction indicators, an electric brake etc.

The central secondary contact 57 comprises two opposite contact tabs 59 which enclose an interior where a corresponding plug-in projection of the Pollack plug can be inserted. In principle, the secondary contact 57 is therefore designed as a socket.

The secondary contacts are arranged in a recess 60 of the housing 21 to protect them from the environment. The recess 60 is bounded by the circumferential wall 26.

At this point, it should be noted that the circumferential wall 26 is substantially cylindrical, but this is not essential. The circumferential wall 26 may further be stepped, i.e. have different sections 35, 36 and 37 with different diameters in the longitudinal direction 34 of the adapter 20. The section 35 may for example represent the circumferential wall around the recess 23, while the section 36 represents a central section with the cover retaining projection 28 and has a smaller diameter than the front section 35. The section 37 represents the circumferential wall around the recess 60 on the secondary side S.

It is, however, advantageous if an external contour of the adapter 20 approximately corresponds to an external contour of the of the trailer socket 96, so that the adapter 20 mounted on the trailer socket 96 together with the trailer socket 96 forms a single unit in a manner of speaking and is as compact as possible.

The secondary contacts 51-57 are for example arranged on a contact insert 67 which is installed into the housing 21. It is, however, also possible for the primary contacts 1-13 and/or the secondary contacts 51-57 to be held by the housing 21 directly, for example by injection-moulding the housing material around them.

A flange plate 61 is provided on the section 37, i.e. on the secondary side S. The secondary side S is further provided with a cover 62 for closing the secondary contact arrangement 50.

The cover 62 is easily gripped by a handle 63 which projects from a base body of the cover 62.

The cover 62 is pivotably mounted on the flange plate 61 by means of a pivot bearing 64. The cover 62 could of course alternatively be pivoted at another point of the housing 21. It is expediently provided that the cover 62 completely closes the recess 60 and expediently encompasses or covers the outside of the section 37 of the circumferential wall 26 which encloses the recess 60 as well. The circumferential wall 26 therefore engages with a recess 65 on the cover 62 when the latter is closed.

In the primary contacts 1-13, i.e. on the primary side P, a coding 38 is provided, for example a projection which engages with a corresponding coding not shown in the drawing which is provided in the trailer socket 96, so that the adapter 20 can only be inserted into the trailer socket in the correct angular position. Expediently, a coding 66, for example a recess suitable for engagement with a corresponding mating coding on the US trailer plug not shown in the drawing, is provided on the secondary side S, i.e. in the secondary contacts 51-57.

The flange plate 61 in a manner of speaking forms a front stop for the US plug. It is advantageously provided that the mechanical components on the secondary side S cover the mechanical components of the adapter 20 which lie behind when the adapter 20 is mounted on the trailer socket 96. The flange plate 61 for example projects beyond the outer circumference of the circumferential wall 26 to the same extent as the cover retaining projection 28.

At this point, it should be noted that it is of course not absolutely necessary to provide a projection on the adapter 20 in order to hold the cover 98 of the trailer socket 96 open, but the plate 29 could for example be mounted directly on a housing having a larger circumference, in which case the foot part 31 would not be required, for example.

The secondary contacts 51-56 have the following pin assignment:

51 Direction indicator left and brake left
52 Earth
53 Electric brake
54 Direction indicator right and brake right
55 Permanent plus K130
56 Rear light left and right
57 Reversing light The socket contacts of the trailer socket 96 are wired as follows:

Socket contact 101: Direction indicator left
Socket contact 102: Rear fog light (optional)
Socket contact 103: Earth for contacts 1-8
Socket contact 104: Direction indicator right
Socket contact 105: Rear light right
Socket contact 106: Brake lights left and right
Socket contact 107: Rear light left
Socket contact 108: Reversing light
Socket contact 109: Power supply (permanent plus) or terminal 30
Socket contact 110: Charging line for trailer battery, power supply, ignition switch-controlled (optional)
Socket contact 111: Earth for circuit via contact 10
Socket contact 112: Electric brake
Socket contact 113: Earth for circuit via contact 9

In the trailer socket 96, a signal for the actuation of an electric brake of the trailer is therefore applied to the socket contact 112. This is because in the USA an electric brake is provided from a specified trailer weight onwards. If the trailer socket 96 is used without the adapter 20 and if for example a trailer with a plug contact assignment according to a European standard is used, this does not cause any damage as a rule, because the socket contact 112 is usually not used.

An innovative circuit diagram for connecting the primary contacts 1-13 to the secondary contacts 51-57 is shown in FIG. 5. An electric connection arrangement 70 comprises electric lines L1, L3-L9, L12 and L13 which are connected to the primary contacts 1, 3-9, 12 and 13.

The line L9 connects the primary contact 9 directly to the secondary contact 55, which means that permanent plus is switched through in a manner of speaking. The primary contact 8 is likewise directly connected to a secondary contact, this being to the secondary contact 57 for the reversing light of the trailer via the line L8.

Finally, the primary contact 12 assigned to the electric brake is likewise directly connected to a secondary contact, this being the secondary contact 53, via the line L12.

As US wiring provides only a single power supply for the right-hand and the left-hand rear lights, the two lines L5-L7 are connected to one another, leading as line S6 to the corresponding secondary contact 56 for the rear light of the trailer.

Each of the primary contacts 3 and 13 is assigned to a chassis earth and can be connected to corresponding socket contacts 103 and 113 of the trailer socket 96. On the secondary side, only a single chassis earth is provided in the adapter 20, this being at the secondary contact 52. In accordance with this, the two lines L3 and L13 are electrically connected to one another and routed as line S2 to the secondary contact 52.

As a US trailer only has a combined brake light/direction indicator, which is permanently supplied with power in the braking process and with pulsed power when indicating a change in direction, corresponding secondary contacts 51, 54 are provided for the left-hand and the right-hand brake light/direction indicator; these represent brake light/direction indicator contacts in a manner of speaking. The secondary contacts 51, 54 are however not directly connected to the associated primary contacts 1 and 6 or 4 and 6 respectively, but via a diode circuit comprising diode elements 71-74, such as blocking diodes, transistors or the like.

The diode circuit with the diode elements 71-74 is preferably arranged on a printed circuit board 75, but so-called floating wiring can of course be used as an alternative. It is for example also possible for the printed circuit board 75 to be integrated with, for example, the contact insert 25 or the contact insert 67 with the secondary contacts 51-57, or for the contact inserts 25 and/or 67 to form supports for electronic components such as the diode elements 71-74.

This printed circuit board 75 or another electronic component may, for example, also support a simulation circuit 76 which may e.g. comprise a storage capacitor, transistors or the like for simulating at least one function on the secondary side S of the adapter 20 towards the primary side P. The simulation circuit 76 may for example simulate flashing pulses at the direction indicator primary contacts 1 and 4 even if there is a steady current applied on the secondary side to the secondary contacts 51 and 54 when a steady current is delivered by the brake light primary contact 6. It is for example possible for the simulation circuit 76 to check whether a current pulse is coming via the lines L1 or L4 while the secondary side circuit is at the same time permanently closed via the lines S1 or S4 (in the case of the brake light) or is in any case closed during the primary side current pulses (in the case of the direction indicator); on the primary side, it would simulate that at the lines S1 or S4 the circuit is closed via the trailer direction indicators during the current pulses.

The lines L1 and L6 are connected via diode elements 71 and 73 to a line S1 which is in turn connected to the secondary contact 51.

The lines L4 and L6, which are connected to the primary contacts 4 and 6, are connected to the secondary contact 54 via diode elements 72 and 74 which are connected to a line S4 on the output side.

The secondary contacts 51 and 54 therefore are brake light/direction indicator contacts for example.

The invention claimed is:

1. An adapter for a trailer socket of a trailer coupling for coupling a trailer to a motor vehicle, wherein the adapter comprises a base body and a primary contact arrangement mounted thereon and comprising a plurality of primary contacts corresponding to a European or German standard, in particular seven primary contacts according to DIN 1724 or thirteen primary contacts according to ISO 11446, for establishing an electric connection to corresponding socket contacts of the trailer socket, and wherein the adapter comprises a secondary contact arrangement mounted on the base body with secondary contacts according to a US American standard, so that a trailer plug corresponding to the US American standard can be electrically connected to the secondary contact arrangement for the power supply of a trailer, the secondary contact arrangement and the primary contact arrangement being connected to one another via an electric connection arrangement.

2. The adapter according to claim 1, wherein the secondary contact arrangement has seven electric contacts and/or corresponds to a Pollack socket type.

3. The adapter according to claim 1, wherein the secondary contact arrangement comprises at least one electric brake light/direction indicator contact provided for the selection of a combined brake light/direction indicator of the trailer, wherein the brake light/direction indicator contact is electrically connected to a brake light primary contact for the selection of a brake light and to a direction indicator primary contact of the primary contact arrangement for the selection of a left- or right-hand direction indicator in such a way that that a current is applied to the brake light/direction indicator contact if a current is applied to the brake light primary contact or the direction indicator primary contact.

4. The adapter according to claim 3, wherein at least one electric diode element is provided between the brake light primary contact and the brake light/direction indicator contact or between the direction indicator primary contact and the brake light/direction indicator contact, the diode element being electrically conductive in a direction from the brake light primary contact or the direction indicator primary contact to the brake light/direction indicator contact and non-conducting in the opposite direction.

5. The adapter according to claim 1, wherein a thread for tightening into a mating thread of the trailer socket is provided on the base body.

6. The adapter according claim 1, wherein a cover retaining projection for holding a cover of the trailer socket in an open position is provided on the base body.

7. The adapter according to claim 1, wherein the cover retaining projection has an external contour which fits positively into an internal contour of the cover of the trailer socket.

8. The adapter according to claim 1, further comprising a cover for closing the secondary contact arrangement.

9. The adapter according to claim 1, wherein a primary contact is provided for the selection of an electric brake of the trailer and is connected to a corresponding secondary contact.

10. The adapter according to claim 1, wherein the primary contact arrangement comprises at least two primary contacts provided for connection to an electric chassis earth, each of them being electrically connected to an electric secondary contact.

11. The adapter according to claim 1, wherein a single secondary contact is provided for the selection of a right-hand and a left-hand rear light of the trailer and forms a secondary rear light contact, and wherein the secondary rear light contact is electrically connected to two separate primary contacts provided for a right-hand and a left-hand rear light.

12. The adapter according to claim 1, further comprising a simulation circuit for generating a signal which simulates a direction indicator of the trailer on at least one primary contact.

13. The adapter according to claim 1, further comprising at least one secondary contact for the transmission of a signal for the selection of an electric brake of the trailer.

* * * * *